(12) United States Patent
Diephuis et al.

(10) Patent No.: US 11,577,634 B1
(45) Date of Patent: Feb. 14, 2023

(54) HEAD RESTRAINT FOR A VEHICLE SEATING ASSEMBLY

(71) Applicant: Ford Global Technologies, LLC, Dearborn, MI (US)

(72) Inventors: Jesse Rene Diephuis, West Bloomfield, MI (US); Michael John Harmon, Westland, MI (US); Andrew Brand, Bloomfield Township, MI (US); Ryan Wayne Warner, Ann Arbor, MI (US); Andrew Smith, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/501,266

(22) Filed: Oct. 14, 2021

(51) Int. Cl.
*B60N 2/859* (2018.01)
*B60N 2/876* (2018.01)
*B60N 2/80* (2018.01)

(52) U.S. Cl.
CPC ............ *B60N 2/859* (2018.02); *B60N 2/876* (2018.02); *B60N 2002/899* (2018.02)

(58) Field of Classification Search
CPC .. B60N 2002/899; B60N 2/876; B60N 2/874; B60N 2/859; B60N 2/856
See application file for complete search history.

(56) References Cited

U.S. PATENT DOCUMENTS

| | | | | |
|---|---|---|---|---|
| 2,649,142 A * | 8/1953 | New | ................... | B60N 2/85 |
| | | | | 280/727 |
| 3,964,788 A * | 6/1976 | Kmetyko | ............... | A47C 7/383 |
| | | | | 297/395 |
| 4,249,754 A * | 2/1981 | Best | ................... | B60N 2/874 |
| | | | | 280/751 |
| 4,458,919 A * | 7/1984 | Kawashima | ............. | A61G 3/02 |
| | | | | 296/68.1 |
| 6,758,527 B2 * | 7/2004 | Schambre | ............. | B60N 2/859 |
| | | | | 280/751 |
| 7,578,535 B2 * | 8/2009 | Thomas | ................... | B60N 2/809 |
| | | | | 297/395 |
| 2003/0214168 A1 * | 11/2003 | Schambre | ............. | B60N 2/856 |
| | | | | 297/391 |
| 2004/0090056 A1 * | 5/2004 | Sung | ..................... | B60N 2/859 |
| | | | | 280/751 |

FOREIGN PATENT DOCUMENTS

| | | | | |
|---|---|---|---|---|
| DE | 19909883 A1 * | 9/1999 | .......... | B60N 2/4855 |
| DE | 102012005905 A1 | 9/2013 | | |
| FR | 2964068 A1 | 3/2012 | | |
| GB | 2325620 A * | 12/1998 | .......... | B60N 2/4841 |

* cited by examiner

*Primary Examiner* — Milton Nelson, Jr.
(74) *Attorney, Agent, or Firm* — Vichit Chea; Price Heneveld LLP

(57) ABSTRACT

A vehicle interior system of a vehicle includes first and second seating assemblies and a roof positioned vehicle-upward of the first and second seating assemblies. A first head restraint of the first seating assembly is pivotably coupled to the roof and operable to pivot relative to the roof about a first pivot axis between a stowed position and a use position vehicle-downward of the stowed position. A second head restraint of the second seating assembly is coupled to the roof and operable to pivot relative to the roof about a second pivot axis between a stowed position and a use position vehicle-downward of the stowed position. The first pivot axis is not parallel to the second pivot axis.

20 Claims, 5 Drawing Sheets

HEAD RESTRAINT FOR A VEHICLE SEATING ASSEMBLY

FIELD OF THE DISCLOSURE

The present disclosure generally relates to a head restraint for a seating assembly of a vehicle. More specifically, the present disclosure generally relates to a head restraint for a vehicle seating assembly that is in a spaced relationship with the seating assembly.

BACKGROUND OF THE DISCLOSURE

Vehicle seating assemblies often include head restraints that are coupled to seatbacks of the seating assemblies.

SUMMARY OF THE DISCLOSURE

According to a first aspect of the present disclosure, a vehicle interior system of a vehicle includes first and second seating assemblies and a roof positioned vehicle-upward of the first and second seating assemblies. A first head restraint of the first seating assembly is pivotably coupled to the roof and operable to pivot relative to the roof about a first pivot axis between a stowed position and a use position vehicle-downward of the stowed position. A second head restraint of the second seating assembly is coupled to the roof and operable to pivot relative to the roof about a second pivot axis between a stowed position and a use position vehicle-downward of the stowed position. The first pivot axis is not parallel to the second pivot axis.

Embodiments of the first aspect of the present disclosure can include any one or a combination of the following features:
  the first pivot axis is substantially perpendicular to the second pivot axis;
  the first seating assembly faces substantially vehicle-forward;
  the second seating assembly faces substantially vehicle-laterally;
  the first head restraint includes a body, and a pivot arm coupled to the body, wherein the pivot arm is pivotably coupled to the roof and operable to pivot about the first pivot axis;
  a vehicle window proximate to the first seating assembly, wherein the body of the first head restraint is positioned vehicle-upward of the vehicle window in the stowed position; and
  the second pivot axis is substantially parallel to a longitudinal centerline of the vehicle.

According to a second aspect of the present disclosure, a vehicle interior system of a vehicle includes a roof, a seating assembly positioned vehicle-downward of the roof, and a head restraint of the seating assembly that is pivotably coupled to the roof and operable to pivot relative to the roof about a pivot axis between a stowed position and a use position. The head restraint includes a pivot arm pivotably coupled to the roof, and a body coupled to the pivot arm. The body is configured to restrain the head of a user of the seating assembly in the use position of the head restraint, and the position of the body in the use position is vehicle-downward of the position of the body in the stowed position.

Embodiments of the second aspect of the present disclosure can include any one or a combination of the following features:
  the pivot axis extends substantially vehicle-laterally;
  the body extends vehicle-laterally-inboard from the pivot arm; and
  at least a portion of the pivot arm is wholly vehicle-laterally-outboard of the body.

According to a third aspect of the present disclosure, a vehicle interior system of a vehicle includes a first seating assembly having a first seatback and a second seating assembly having a second seatback. The vehicle interior system also includes a first head restraint of the first seating assembly in a spaced relationship with the first seatback and which is operable to pivot about a first pivot axis between a stowed position and a use position. In the stowed position, the first head restraint is a first distance from the first seatback. In the use position, the first head restraint is a second distance from the first seatback. The first distance is greater than the second distance. The vehicle interior system further includes a second head restraint of the second seating assembly in a spaced relationship with the second seatback and which is operable to pivot about a second pivot axis between a stowed position and a use position. In the stowed position, the second head restraint is a third distance from the second seatback. In the use position, the second head restraint is a fourth distance from the second seatback. The third distance is greater than the fourth distance, and the first pivot axis is not parallel to the second pivot axis.

Embodiments of a third aspect of the present disclosure can include any one or a combination of the following features:
  the first pivot axis is substantially perpendicular to the second pivot axis;
  the first seating assembly faces substantially vehicle-forward;
  the second seating assembly faces substantially vehicle-laterally;
  the first head restraint includes a body, and a pivot arm coupled to the body, wherein the pivot arm is pivotably coupled to the roof and operable to pivot about the first pivot axis;
  the body extends vehicle-laterally-inboard from the pivot arm;
  a vehicle window proximate to the first seating assembly, wherein the body of the first head restraint is positioned vehicle-upward of the vehicle window in the stowed position;
  the second pivot axis is substantially parallel to a longitudinal centerline of the vehicle; and
  the first head restraint is pivotably coupled to a roof of the vehicle.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
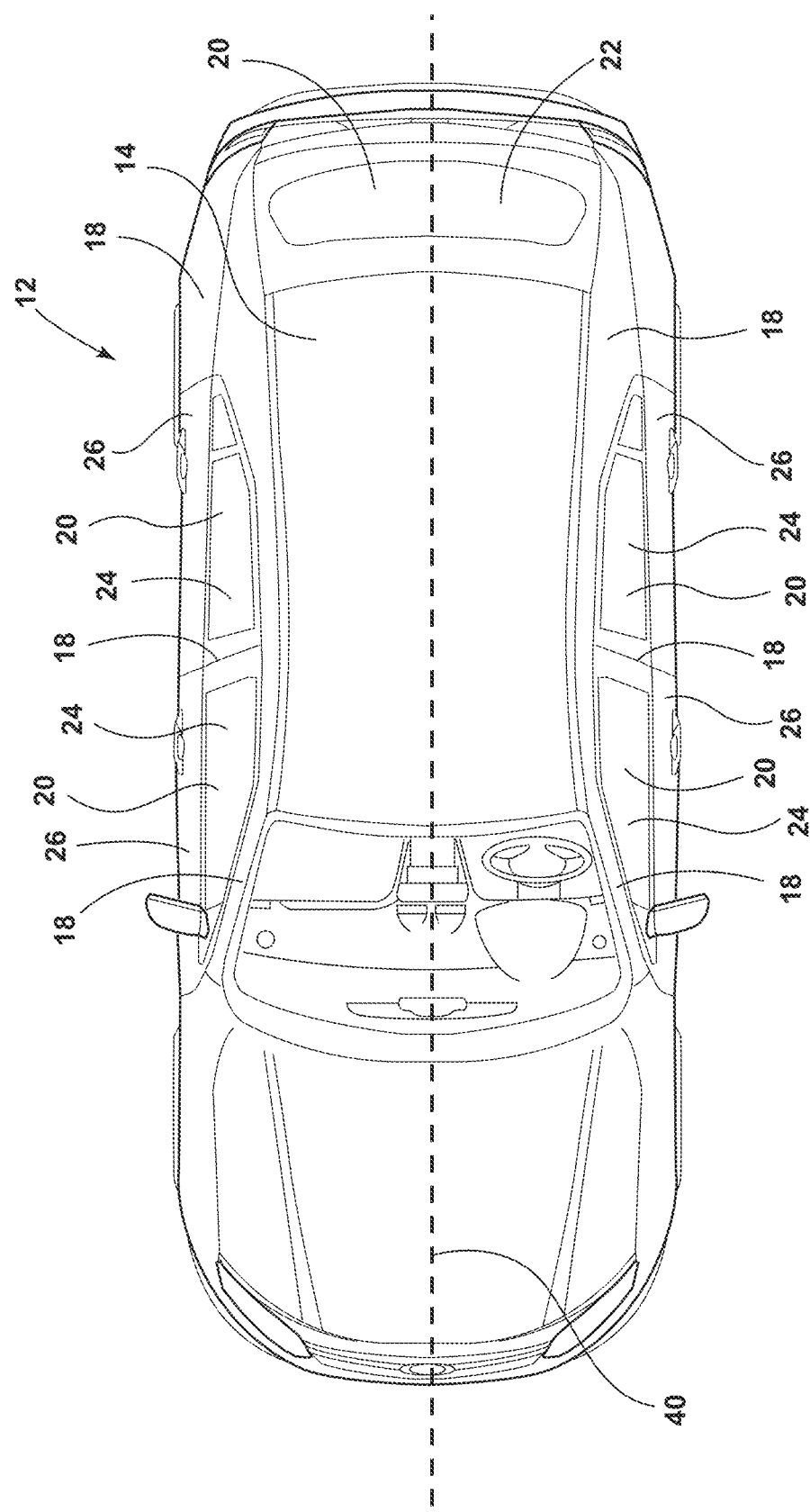
FIG. 1 is a plan view of a vehicle, illustrating a longitudinal centerline of the vehicle, according to one embodiment.

Additional features and advantages of the present disclosure will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as "first" and "second," "top" and "bottom," and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring now to FIGS. 1-5, a vehicle interior system 10 of a vehicle 12 includes first and second seating assemblies 28A, 28B. A roof 14 is positioned vehicle-upward of the first and second seating assemblies 28A, 28B. A first head restraint 36A of the first seating assembly 28A is pivotably coupled to the roof 14 and is operable to pivot relative to the roof 14 about a first pivot axis 38A between a stowed position and a use position that is vehicle-downward of the stowed position. A second head restraint 36B of the second seating assembly 28B is coupled to the roof 14 and is operable to pivot relative to the roof 14 about a second pivot axis 38B between a stowed position and a use position that is vehicle-downward of the stowed position. The first pivot axis 38A is not parallel to the second pivot axis 38B.

Referring now to FIGS. 1-4, the vehicle 12 includes a roof 14 and a vehicle interior 16.

Figure 3:
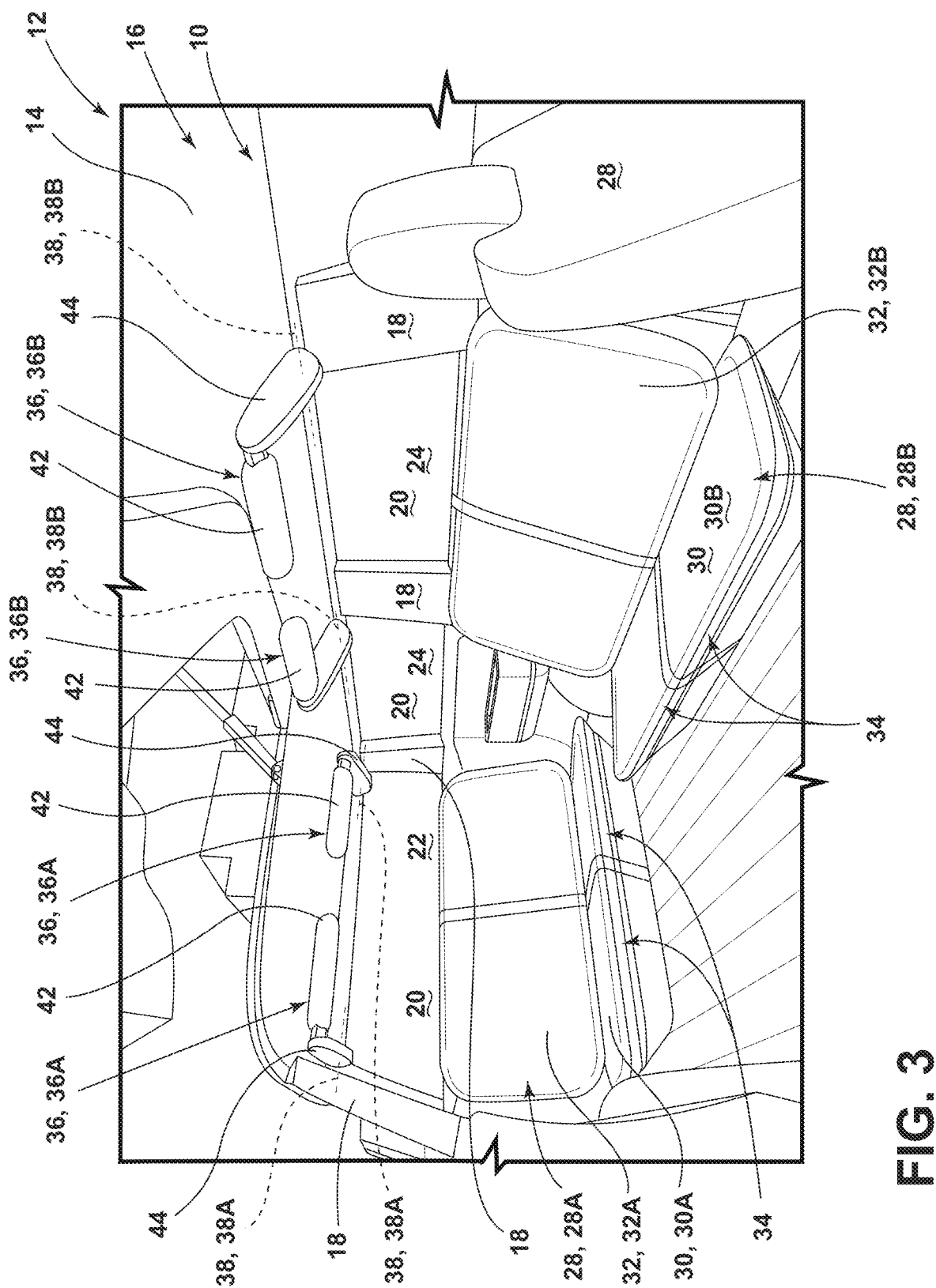
FIG. 3 is a front perspective view of a vehicle interior of the vehicle, illustrating the first and second head restraints in stowed positions, according to one embodiment.
Figure 4:
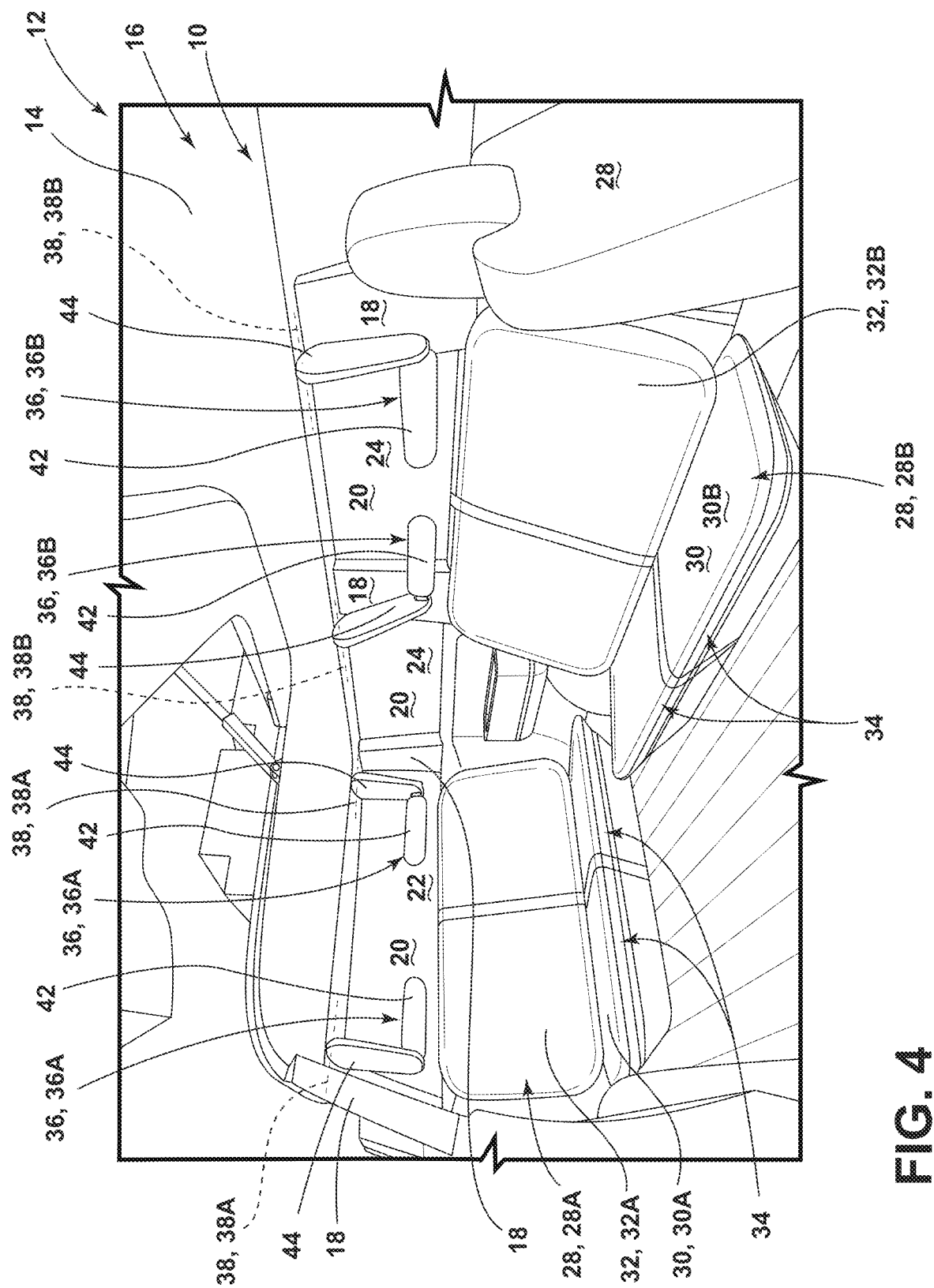
FIG. 4 is a front perspective view of the vehicle interior, illustrating the first and second head restraints in use positions, according to one embodiment.

The vehicle interior may be vehicle-downward of the roof 14. As illustrated in FIGS. 1, 3, and 4, a plurality of pillars 18 of the vehicle 12 (e.g., A pillar, B pillar, etc.) may extend vehicle-downward from the roof 14 of the vehicle 12. The vehicle 12 may include a vehicle window 20. The vehicle window 20 may be vehicle-downward of the roof 14 of the vehicle 12. The vehicle window 20 may be positioned between two of the pillars 18 of the vehicle 12. Further, in some embodiments, the vehicle 12 may include a plurality of vehicle windows 20, as illustrated exemplarily in FIGS. 3 and 4. In some embodiments, the vehicle window 20 may be a rear vehicle window 22 that is opposite a windshield of the vehicle 12. The vehicle 12 may include side vehicle windows 24. The side vehicle windows 24 may be positioned on side doors 26 of the vehicle 12, in some embodiments.

Figure 2:
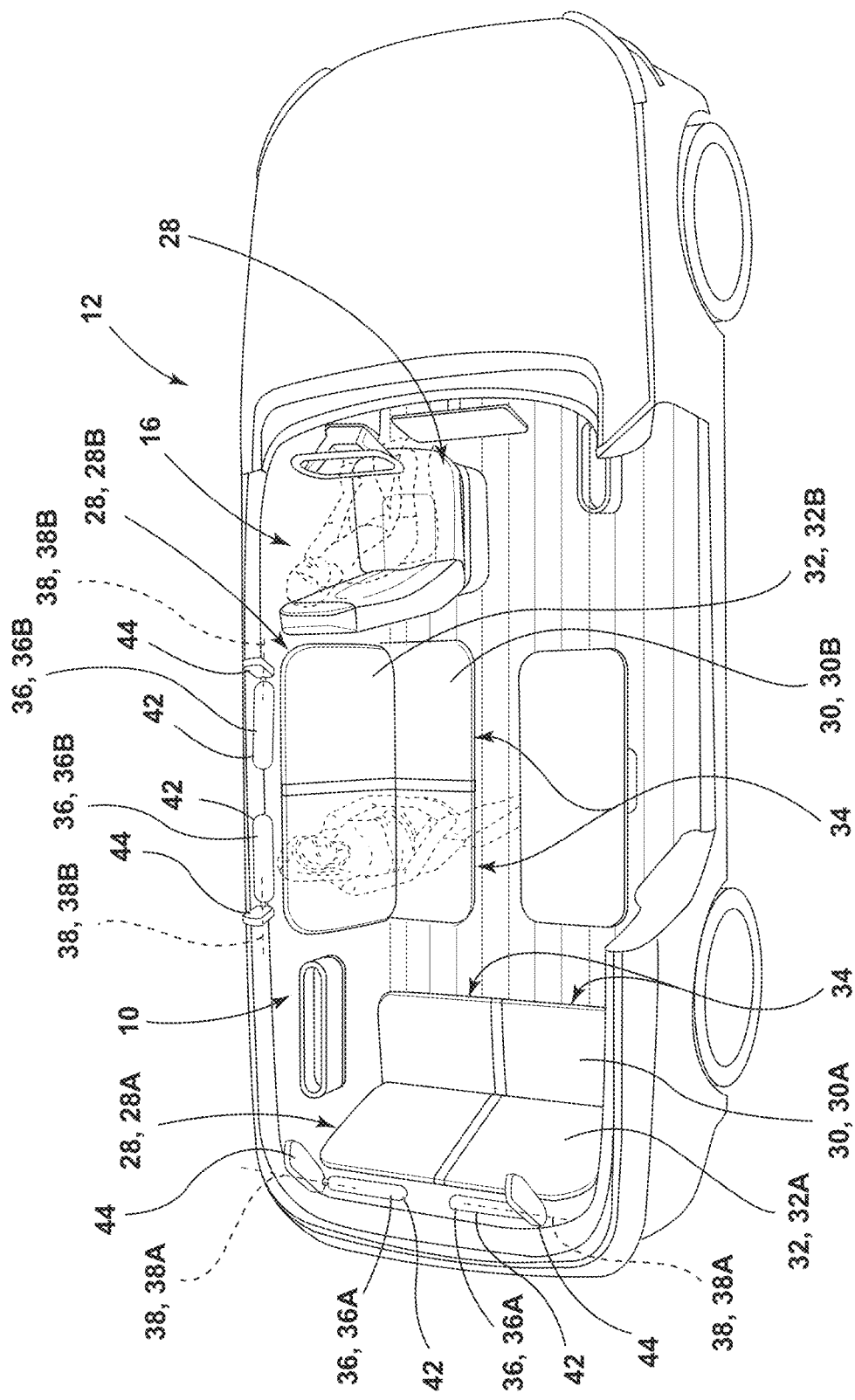
FIG. 2 is a top perspective view of the vehicle, illustrating a vehicle interior having first and second seating assemblies and first and second head restraints that correspond with the first and second seating assemblies, according to one embodiment.

Referring now to FIGS. 2-4, the vehicle 12 may include a seating assembly 28. The seating assembly 28 may include a seat base 30 and a seatback 32. The seatback 32 may be coupled to the seat base 30, as illustrated in FIGS. 3 and 4. In various embodiments, the vehicle 12 may include a plurality of seating assemblies 28. For example, as illustrated in FIGS. 2-4, the vehicle 12 includes a first seating assembly 28A having a first seat base 30A and a first seatback 32A and a second seating assembly 28B having a second seat base 30B and a second seatback 32B. The roof 14 may be positioned vehicle-upward of the first and second seating assemblies 28A, 28B, in various embodiments. The seating assembly 28 of the vehicle 12 is configured to accommodate at least one seated user. In some embodiments, the seating assembly 28 may be configured to accommodate a plurality of seated users. For example, as illustrated in FIGS. 2-4, the first seating assembly 28A and the second seating assembly 28B within the vehicle interior 16 are bench-style seating assemblies 28 that have two seats 34 that each accommodate a seated occupant. A variety of types of seating assemblies 28 are contemplated (e.g., bench seats, bucket seats, captain's chair, etc.).

Referring still to FIGS. 2-4, the seating assembly 28 of the vehicle 12 may face at least one of a variety of vehicle directions. In some embodiments, the seating assembly 28 may face vehicle-forward. In some embodiments, the seating assembly 28 may face vehicle-laterally. A variety of vehicle directions are contemplated (e.g., vehicle-rearward, etc.). In some embodiments, wherein the vehicle 12 includes a plurality of seating assemblies 28, one or more of the plurality of seating assemblies 28 may face a different vehicle direction than one or more other seating assemblies 28 of the vehicle 12. For example, in the embodiment illustrated in FIG. 2, the first seating assembly 28A faces substantially vehicle-forward, and the second seating assembly 28B faces substantially vehicle-laterally.

Referring still to FIGS. 2-4, the seating assembly 28 of the vehicle 12 may include a head restraint 36. In various embodiments, the vehicle 12 may include a plurality of head restraints 36. For example, the vehicle 12 may include a first head restraint 36A that corresponds with the first seating assembly 28A of the vehicle 12 and a second head restraint 36B that corresponds with the second seating assembly 28B of the vehicle 12. In some embodiments, a seating assembly 28 of the vehicle 12 may include a plurality of head restraints 36. For example, in the embodiment illustrated in FIG. 4, the first seating assembly 28A includes two seats 34 and two first head restraints 36A that are configured to restrain the heads users seated in the two seats 34, respectively. Likewise, the second seating assembly 28B includes two second head restraints 36B that are configured to restrain the heads of two users seated in the seats 34 the second seating assembly 28B, respectively.

Referring still to FIGS. 2-4, in various embodiments, the head restraint 36 of the seating assembly 28 may be in a spaced relationship with the seatback 32 of the seating assembly 28. In other words, the head restraint 36 may be not directly coupled to the seatback 32 of the seating assembly 28. In various embodiments, the head restraint 36 may be mounted to a portion of the vehicle 12 that is vehicle-upward of upper-most portion of the seatback 32 that the head restraint 36 corresponds to. In some embodiments, the head restraint 36 may be mounted to a portion of the vehicle 12 that is above (i.e., directly vehicle-upward of) the upper-most portion of the seatback 32. In some embodiments, the head restraint 36 may be coupled to the roof 14 of the vehicle 12, as illustrated in FIGS. 3 and 4. It is contemplated that the head restraint 36 may be coupled to a variety of vehicle components, such as one or more pillars 18 of the vehicle 12.

In various embodiments, the head restraint 36 may be operable between a stowed position and a use position. The head restraint 36 may move between the stowed and use positions by pivoting about a pivot axis 38 within the vehicle interior 16. In some embodiments, the head restraint 36 may be pivotably coupled to the roof 14 of the vehicle 12, as illustrated in FIGS. 3 and 4, and operable to pivot about the pivot axis 38 from the stowed position, as illustrated in FIG. 3, to the use position, as illustrated in FIG. 4. It is contemplated that the head restraint 36 may be pivotably coupled to other portions of the vehicle 12 that are vehicle-upward of the seatback 32 of the seating assembly 28 that the head restraint 36 corresponds to (e.g., one or more pillars 18, etc.).

Referring now to FIGS. 2-4, in some embodiments, wherein the vehicle 12 includes a plurality of head restraints 36, the plurality of head restraints 36 may pivot about a plurality of corresponding pivot axes 38. For example, the first head restraint 36A that corresponds with the first seating assembly 28A may pivot about a first pivot axis 38A, and the second head restraint 36B that corresponds with the second seating assembly 28B may pivot about a second pivot axis 38B. It is contemplated that the first and/or second pivot axes 38A, 38B may extend in one or more of a variety of vehicle directions. In some embodiments, the first pivot axis 38A and/or the second pivot axis 38B may extend substantially vehicle-laterally (i.e., substantially perpendicular to a longitudinal centerline 40 of the vehicle 12). In some embodiments, the first pivot axis 38A and/or the second pivot axis 38B may extend substantially vehicle-longitudinally (i.e., substantially parallel to the longitudinal centerline 40 of the vehicle 12; substantially parallel to the vehicle-forward and vehicle-rearward directions). In various embodiments, the first pivot axis 38A may be not parallel to the second pivot axis 38B. In some embodiments, the first pivot axis 38A may be substantially perpendicular to the second pivot axis 38B. For example, as illustrated in FIG. 2, the first pivot axis 38A extends substantially vehicle-laterally, and the second pivot axis 38B extends substantially vehicle-longitudinally. As such, the first pivot axis 38A is substantially perpendicular to the second pivot axis 38B.

Referring still to FIGS. 2-4, in some embodiments, wherein the seating assembly 28 includes a plurality of head restraints 36 that correspond with a plurality of seats 34 (each of which is configured to accommodate a seated user) of the seating assembly 28, each of the plurality of head restraints 36 may pivot between the use and stowed positions about respective pivot axes 38. For example, as illustrated in FIG. 2, the first seating assembly 28A includes two first head restraints 36A that are operable to pivot about two first pivot axes 38A. The two first pivot axes 38A are substantially parallel to each other. Similarly, in the embodiment illustrated in FIG. 2, the second seating assembly 28B includes two second head restraints 36B that are operable to pivot about two second pivot axes 38B. The two second pivot axes 38B are substantially parallel to each other and substantially perpendicular to the two first pivot axes 38A.

Referring now to FIGS. 2-4, in some embodiments, the head restraint 36 may include a body 42 and a pivot arm 44 coupled to the body 42. The pivot arm 44 of the head restraint 36 may be coupled to and operable to pivot relative to a portion of the vehicle 12. For example, as illustrated in FIGS. 3 and 4, the pivot arm 44 of the head restraint 36 is pivotably coupled to the roof 14 of the vehicle 12 and operable to pivot relative to the roof 14 of the vehicle 12 between the use and stowed positions. It is contemplated that the pivot arm 44 may be pivotably coupled to various other portions of the vehicle 12 (e.g., pillar 18, etc.). The body 42 of the head restraint 36 coupled to the pivot arm 44 may be configured to restrain the head of a user of the seating assembly 28 in the use position of the head restraint 36, as described further herein.

In some embodiments, the body 42 of the head restraint 36 may extend vehicle-laterally-inboard from the pivot arm 44 of the head restraint 36. In other words, the body 42 may extend toward the longitudinal centerline 40 of the vehicle 12 from the pivot arm 44. In some embodiments, at least a portion of the pivot arm 44 may be wholly vehicle-laterally-outboard of the body 42. In other words, at least a portion of the pivot arm 44 may be further away from the longitudinal centerline 40 of the vehicle 12 than the entirety of the body 42. In some embodiments, wherein the pivot axis 38 that the head restraint 36 is operable to pivot about extends substantially vehicle-laterally, at least a portion of the pivot arm 44 may be wholly vehicle-laterally-outboard of the body 42. In some embodiments, the body 42 may extend vehicle-rearward from the pivot arm 44 of the head restraint 36. In some embodiments, wherein the pivot axis 38 that the head restraint 36 is operable to pivot about extends substantially vehicle-longitudinally, at least a portion of the pivot arm 44 may be wholly vehicle-forward of the body 42. In some embodiments, the body 42 may extend vehicle-forward from the pivot arm 44 of the head restraint 36. In some embodiments, wherein the pivot axis 38 that the head restraint 36 is operable to pivot about extends substantially vehicle-longitudinally, at least a portion of the pivot arm 44 may be wholly vehicle-rearward of the body 42.

In the embodiment illustrated in FIGS. 2-4, the first seating assembly 28A includes two first head restraints 36A, and the second seating assembly 28B includes two second head restraints 36B. Each of the head restraints 36 includes the pivot arm 44 and the body 42. The pivot arms 44 of the two first head restraints 36A are operable to pivot about two parallel first pivot axes 38A that extend substantially vehicle-laterally. The bodies 42 of the two first head restraints 36A extend vehicle-laterally-inboard from the respective pivot arms 44 generally toward each other. The pivot arms 44 of the two second head restraints 36B are operable to pivot about two parallel second pivot axes 38B that extend substantially vehicle-longitudinally. The bodies 42 of the two second head restraints 36B extend vehicle-forward and vehicle-rearward, respectively, generally toward each other from their respective pivot arms 44.

The bodies 42 extending outward from the pivots arms 44, as described above and illustrated in FIGS. 2-4, results in generally L-shaped head restraints 36. The L-shaped head restraints 36 may minimize sight line obstructions for users of the vehicle 12 looking out vehicle windows 20 while the head restraints 36 are in the use positions. For example, as illustrated in FIG. 4, the pivot arms 44 of the two second head restraints 36B are generally aligned with pillars 18 of the vehicle 12, such that the vehicle window 20 between the pillars 18 is not significantly obstructed by the pivot arms 44. The bodies 42 of the two second head restraints 36B extend toward each other from the pivot arms 44 to restrain the heads of two seated users of the second seating assembly 28B. A variety of types of head restraints 36 are contemplated.

Referring now to FIGS. 3 and 4, the head restraint 36 is operable to move between the stowed position (FIG. 3) and the use position (FIG. 4). As described above herein, in various embodiments, the head restraint 36 is configured to pivot about the pivot axis 38 between the stowed and use positions. In some embodiments, the position of the head restraint 36 in the use position is vehicle-downward of the position of the head restraint 36 in the stowed position. For example, in the embodiment illustrated in FIGS. 3 and 4, the position of the body 42 of the head restraint 36 in the use position, as illustrated in FIG. 4, is vehicle-downward of the position of the body 42 in the stowed position, as illustrated in FIG. 3. In some embodiments, the head restraint 36 may be positioned vehicle-upward of the vehicle window 20 of the vehicle 12 in the stowed position of the head restraint 36. For example, in the embodiment illustrated in FIG. 3, the vehicle window 20 is proximate to the first seating assembly 28A, and the body 42 of the first head restraint 36A of the first seating assembly 28A is positioned vehicle-upward of the vehicle window 20 in the stowed position. In various embodiments, the body 42 of the head restraint 36 may be vertically aligned with the vehicle window 20 in the use position of the head restraint 36, as illustrated in FIG. 4.

In some embodiments, wherein the vehicle 12 includes the first seating assembly 28A having the first seatback 32A and the second seating assembly 28B having the second seatback 32B, the first head restraint 36A of the first seating assembly 28A is in a spaced relationship with the first seatback 32A, and the second head restraint 36B of the second seating assembly 28B is in a spaced relationship with the second seatback 32B. The first head restraint 36A is operable to pivot about the first pivot axis 38A between the stowed position, as illustrated in FIG. 3, and the use position, as illustrated in FIG. 4. In the stowed position of the first head restraint 36A, the first head restraint 36A is a first distance from the first seatback 32A. In the use position of the first head restraint 36A, the first head restraint 36A is a second distance from the first seatback 32A, wherein the first distance is greater than the second distance. The second head restraint 36B is operable to pivot about the second pivot axis 38B between the stowed position, as illustrated in FIG. 3, and the use position, as illustrated in FIG. 4. In the stowed position of the second head restraint 36B, the second head restraint 36B is a third distance from the second seatback 32B. In the use position of the second head restraint 36B, the second head restraint 36B is a fourth distance from the second seatback 32B, wherein the third distance is greater than the fourth distance.

Figure 5:
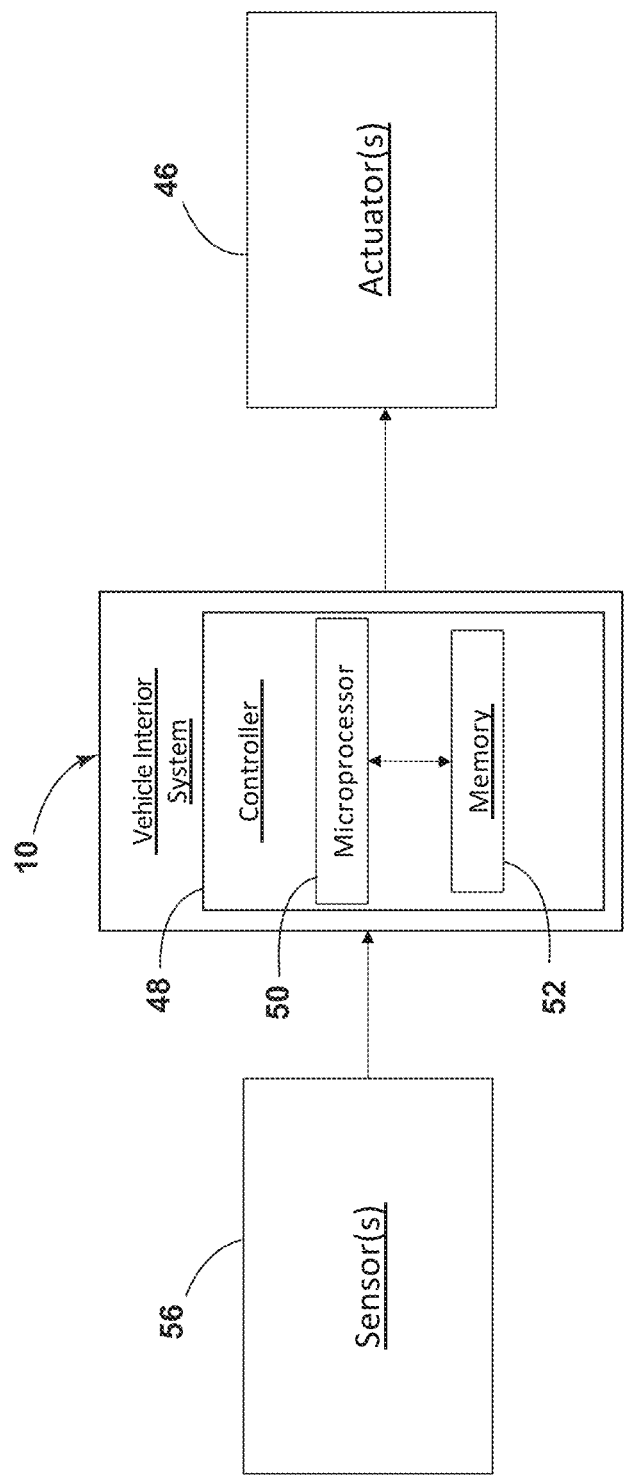
FIG. 5 is a block diagram of a vehicle interior system of the vehicle, according to one embodiment.

Referring now to FIG. 5, the vehicle 12 may include an actuator 46 that is configured to actuate to move the head restraint 36 between the use and stowed positions. In some embodiments, the vehicle 12 may include a plurality of actuators 46 that are configured to move a plurality of corresponding head restraints 36 between the use and stowed positions. Various types of actuators 46 are contemplated. For example, in some embodiments, the actuator 46 may be an electric motor.

Referring still to FIG. 5, the vehicle 12 may include a controller 48. The controller 48 may be configured to receive various inputs and generate various output signals to the actuator 46, as described further herein. The controller 48 may be a shared or dedicated controller 48 that includes a microprocessor 50 and memory 52, as illustrated in FIG. 5, according to various embodiments. It should be appreciated that the controller 48 may include control circuitry, such as analog and/or digital control circuitry. Stored within the memory 52 and executed by the microprocessor 50 is logic for processing the various inputs and controlling various outputs, as described further herein.

In some embodiments, the vehicle 12 may include one or more sensors 56. The one or more sensors 56 may be configured to sense a user ingress event, wherein a user enters the vehicle 12. It is contemplated that the one or more sensors 56 may sense a user ingress event in a variety of manners (e.g., sensing the door 26 of the vehicle opening, sensing the user entering the vehicle 12, sensing a portable electronic device entering the vehicle 12, and/or a combination thereof, etc.). In some embodiments, the one or more sensors 56 may sense a user seating event, wherein the user sits in one of the seats 34 of the vehicle 12. Further, the one or more sensors 56 may sense which seat 34 the user is sitting in and/or which seats 34 the user is not sitting in. It is contemplated that the one or more sensors 56 may sense a user seating event in a variety of manners (e.g., sensing weight, movement, and/or lack thereof of one or more seating assemblies 28, sensing the position of the user within the vehicle 12, sensing the position of a portable device within the vehicle 12, and/or a combination thereof, etc.). It is contemplated that the one or more sensors 56 of the vehicle 12 may include one or more of a variety of types of sensors 56 (e.g., imagers, weight sensors, motion sensors, temperature sensors, etc.).

In various embodiments, the one or more sensors 56 of the vehicle 12 may be in communication with the controller 48 of the vehicle 12. In some embodiments, the one or more sensors 56 may transmit sensed user ingress event inputs and/or sensed user seating event inputs to the controller 48. The controller 48 may control the actuators 46 based on the user ingress event inputs and/or the user seating event inputs. For example, in some embodiments, the controller 48 may prompt the actuator 46 to move the head restraint 36 from the stowed position to the use position in response to receiving a user ingress event input from the one or more sensors 56. Further, in some embodiments, the controller 48 may prompt the actuator 46 to move the head restraint 36 from the use position to the stowed position in response to receiving a user seating event input from the one or more sensors 56.

In operation of an exemplary embodiment, wherein the vehicle 12 includes the first seating assembly 28A having the first head restraint 36A and the second seating assembly 28B having the second head restraint 36B, the first and second head restraints 36A, 36B are initially in the stowed positions. Next, the controller 48 controls actuators 46 to move the first and second head restraints 36A, 36B to the use positions in response to receiving a user ingress event input from the one or more sensors 56. Subsequently, the controller 48 controls the actuator 46 of the first head restraint 36A to move the first head restraint 36A back to the stowed position in response to receiving a user seating event input that indicates that the user sat in the seat 34 of the second seating assembly 28B and no user sat in the seat 34 of the second seating assembly 28B. From the perspective of the user, the first and second head restraints 36A, 36B move from the stowed positions to the use positions as the user enters the vehicle 12. After the user sits in the seat 34 of the first seating assembly 28A, the first head restraint 36A remains in the use position to accommodate the user, and the second head restraint 36B is moved back to the stowed position, as no user is seated within the second seating assembly 28B.

The vehicle interior system 10 of the present disclosure may provide a variety of advantages. First, the head restraint 36 being movable to the stowed position may provide for unobstructed sightlines out of the vehicle window 20 for users of the vehicle 12. Second, the head restraint 36 being L-shaped may aid in minimizing the sightline obstructions caused by the head restraint 36 in the use position.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle interior system of a vehicle, comprising:
    first and second seating assemblies;
    a roof positioned vehicle-upward of the first and second seating assemblies;
    a first head restraint of the first seating assembly that is pivotably coupled to the roof and operable to pivot relative to the roof about a first pivot axis between a stowed position and a use position vehicle-downward of the stowed position; and
    a second head restraint of the second seating assembly that is coupled to the roof and operable to pivot relative to the roof about a second pivot axis between a stowed position and a use position vehicle-downward of the stowed position, wherein the first pivot axis is not parallel to the second pivot axis.

2. The vehicle interior system of claim 1, wherein the first pivot axis is substantially perpendicular to the second pivot axis.

3. The vehicle interior system of claim 1, wherein the first seating assembly faces substantially vehicle-forward.

4. The vehicle interior system of claim 3, wherein the second seating assembly faces substantially vehicle-laterally.

5. The vehicle interior system of claim 1, wherein the first head restraint comprises:
    a body; and
    a pivot arm coupled to the body, wherein the pivot arm is pivotably coupled to the roof and operable to pivot about the first pivot axis.

6. The vehicle interior system of claim 5, further comprising:
    a vehicle window proximate to the first seating assembly, wherein the body of the first head restraint is positioned vehicle-upward of the vehicle window in the stowed position.

7. The vehicle interior system of claim 1, wherein the second pivot axis is substantially parallel to a longitudinal centerline of the vehicle.

8. A vehicle interior system of a vehicle, comprising:
    at least one seating assembly having at least one seatback;
    a first head restraint of the at least one seating assembly in a spaced relationship with the at least one seatback and operable to pivot about a first pivot axis between a stowed position, wherein the first head restraint is a first distance from the at least one seatback, and a use position, wherein the first head restraint is a second distance from the at least one seatback, wherein the first distance is greater than the second distance; and
    a second head restraint of the at least one seating assembly in a spaced relationship with the at least one seatback and operable to pivot about a second pivot axis between a stowed position, wherein the second head restraint is a third distance from the at least one seatback, and a use position, wherein the second head restraint is a fourth distance from the at least one seatback, wherein the third distance is greater than the fourth distance, and wherein the first pivot axis is not parallel to the second pivot axis.

9. The vehicle interior system of claim 8, wherein the first pivot axis is substantially perpendicular to the second pivot axis.

10. The vehicle interior system of claim 8, wherein the first head restraint comprises:
    a body; and
    a pivot arm coupled to the body, wherein the pivot arm is pivotably coupled to a roof of the vehicle and operable to pivot relative to the roof between the stowed and use positions about the first pivot axis.

11. The vehicle interior system of claim 10, wherein the body extends vehicle-laterally-inboard from the pivot arm.

12. A vehicle interior system of a vehicle, comprising:
    a first seating assembly having a first seatback;
    a second seating assembly having a second seatback;
    a first head restraint of the first seating assembly in a spaced relationship with the first seatback and operable to pivot about a first pivot axis between a stowed position, wherein the first head restraint is a first distance from the first seatback, and a use position, wherein the first head restraint is a second distance from the first seatback, wherein the first distance is greater than the second distance; and
    a second head restraint of the second seating assembly in a spaced relationship with the second seatback and operable to pivot about a second pivot axis between a stowed position, wherein the second head restraint is a third distance from the second seatback, and a use position, wherein the second head restraint is a fourth distance from the second seatback, wherein the third distance is greater than the fourth distance, and wherein the first pivot axis is not parallel to the second pivot axis.

13. The vehicle interior system of claim 12, wherein the first pivot axis is substantially perpendicular to the second pivot axis.

14. The vehicle interior system of claim 12, wherein the first seating assembly faces substantially vehicle-forward.

15. The vehicle interior system of claim 14, wherein the second seating assembly faces substantially vehicle-laterally.

16. The vehicle interior system of claim 12, wherein the first head restraint comprises:
- a body; and
- a pivot arm coupled to the body, wherein the pivot arm is pivotably coupled to a roof and operable to pivot about the first pivot axis.

17. The vehicle interior system of claim 16, wherein the body extends vehicle-laterally-inboard from the pivot arm.

18. The vehicle interior system of claim 16, further comprising:
- a vehicle window proximate to the first seating assembly, wherein the body of the first head restraint is positioned vehicle-upward of the vehicle window in the stowed position.

19. The vehicle interior system of claim 12, wherein the second pivot axis is substantially parallel to a longitudinal centerline of the vehicle.

20. The vehicle interior system of claim 12, wherein the first head restraint is pivotably coupled to a roof of the vehicle.

* * * * *